United States Patent
Smolyanskiy et al.

(10) Patent No.: US 10,274,737 B2
(45) Date of Patent: Apr. 30, 2019

(54) SELECTING PORTIONS OF VEHICLE-CAPTURED VIDEO TO USE FOR DISPLAY

(71) Applicant: Microsoft Technology Licensing, LLC, Redmond, WA (US)

(72) Inventors: Nikolai Smolyanskiy, Seattle, WA (US); Zhengyou Zhang, Redmond, WA (US); Sean Eron Anderson, Redmond, WA (US); Michael Hall, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/056,804

(22) Filed: Feb. 29, 2016

(65) Prior Publication Data
US 2017/0251176 A1    Aug. 31, 2017

(51) Int. Cl.
G09G 5/36    (2006.01)
G02B 27/01   (2006.01)
(Continued)

(52) U.S. Cl.
CPC .......... *G02B 27/0179* (2013.01); *B60R 11/04* (2013.01); *G02B 27/017* (2013.01);
(Continued)

(58) Field of Classification Search
CPC ............ G02B 27/017; G02B 2027/014; G02B 2027/0141; G02B 27/0179; G06T 19/006;
(Continued)

(56) References Cited

U.S. PATENT DOCUMENTS

| 5,495,576 A * | 2/1996 | Ritchey ................... G06T 17/00 345/420 |
| 6,133,944 A | 10/2000 | Braun et al. |

(Continued)

OTHER PUBLICATIONS

Watson, B. and Hodges, L. Using Texture Maps to Correct for Optical Distortion in Head-Mounted Displays. In Proceedings of IEEE VRAIS'95, IEEE Computer Society, 1995.*

(Continued)

*Primary Examiner* — Ke Xiao
*Assistant Examiner* — Gordon Liu
(74) *Attorney, Agent, or Firm* — Schwegman Lundberg & Woessner, P.A.

(57) ABSTRACT

A vehicle camera system captures and transmits video to a user device, which includes a viewing device for playback of the captured video, such as virtual reality or augmented reality glasses. A rendering map is generated that indicates which pixels of the video frame (as identified by particular coordinates of the video frame) correspond to which coordinates of a virtual sphere in which a portion of the video frame is rendered for display. When a video frame is received, the rendering map is used to determine the texture values (e.g., colors) for coordinates in the virtual sphere, which is used to generate the display for the user. This technique reduces the rendering time when a user turns his or her head (e.g., while in virtual reality) and so it reduces motion and/or virtual reality sickness induced by the rendering lag.

20 Claims, 8 Drawing Sheets

(51) Int. Cl.
  B60R 11/04 (2006.01)
  G06T 3/00 (2006.01)
  H04N 5/232 (2006.01)
  H04N 19/00 (2014.01)
  H04N 7/18 (2006.01)
  H04N 13/00 (2018.01)
  H04N 21/414 (2011.01)
  H04N 21/4223 (2011.01)

(52) U.S. Cl.
  CPC ......... *G06T 3/005* (2013.01); *H04N 5/23203* (2013.01); *H04N 5/23238* (2013.01); *H04N 7/183* (2013.01); *H04N 13/00* (2013.01); *H04N 19/00* (2013.01); *G02B 2027/0178* (2013.01); *G02B 2027/0187* (2013.01); *H04N 21/41422* (2013.01); *H04N 21/4223* (2013.01)

(58) Field of Classification Search
  CPC ... G06T 13/00; G06T 2215/16; G06T 3/0043; H04N 13/0033
  USPC .......................................................... 345/547
  See application file for complete search history.

(56) References Cited

U.S. PATENT DOCUMENTS

| | | | |
|---|---|---|---|
| 7,154,504 | B2 | 12/2006 | Abdo |
| 8,831,278 | B2 | 9/2014 | Fedorovskaya et al. |
| 9,143,693 | B1 | 9/2015 | Zhou et al. |
| 2006/0023105 | A1* | 2/2006 | Kostrzewski ......... G06T 3/0018 348/335 |
| 2006/0055628 | A1 | 3/2006 | Sanders-Reed et al. |
| 2006/0256113 | A1 | 11/2006 | Grover et al. |
| 2007/0211955 | A1 | 9/2007 | Pan et al. |
| 2012/0050143 | A1 | 3/2012 | Border et al. |
| 2014/0063061 | A1* | 3/2014 | Reitan ................... G09G 3/003 345/633 |
| 2014/0125668 | A1 | 5/2014 | Steed et al. |
| 2015/0325027 | A1 | 11/2015 | Herman et al. |
| 2017/0083748 | A1* | 3/2017 | Zhou ................... G06K 9/0063 |

OTHER PUBLICATIONS

Mirk, David, and Helmut Hlavacs. "Virtual tourism with drones: experiments and lag compensation." Proceedings of the First Workshop on Micro Aerial Vehicle Networks, Systems, and Applications for Civilian Use. ACM, 2015.*

Coxworth, "Shift handles the camera work for drone pilots", Available at: http://www.gizmag.com/perceptiv-labs-shift/36269/, Feb. 25, 2015, 5 pages.

Do, "CIS400/401 LAKITU: Long-range Aerial Kinetic Immersive Telepresence Unit", Retrieved on: Feb. 4, 2016—Available at: http://www.seas.upenn.edu/~cse400/CSE400_2014_2015/reports/05_report.pdf, 2014, 6 pages.

Pittman, "Exploring Head Tracked Head Mounted Displays for First Person Robot Teleoperation", In Proceedings of the 19th international conference on Intelligent User Interfaces, Feb. 24, 2014, 6 pages.

Senese, "Parrot's Small New Drone Revolutionizes Video with a Virtual Gimbal", Available at: http://makezine.com/2014/05/12/parrot-bebop-drone/, May 12, 2014, 10 pages.

Storm, "Continued Work Towards a Virtual Gimbal", Available at: http://diydrones.com/profiles/blogs/continued-work-towards-a-virtual-gimbal, Nov. 29, 2013, 6 pages, Feb. 24, 2017.

"International Search Report and Written Opinion Issued in PCT Application No. PCT/US2017/019227", dated Nov. 14, 2017, 13 Pages.

* cited by examiner

US 10,274,737 B2

SELECTING PORTIONS OF VEHICLE-CAPTURED VIDEO TO USE FOR DISPLAY

BACKGROUND

Remote control vehicles have become increasingly popular. This is particularly the case with respect to unmanned aerial vehicles (UAVs), which typically include stabilization technology allowing the UAVs to be flown more easily, especially by novice users. Some of these remote control vehicles also include a camera that allows video to be captured and transmitted back to the user for display on a screen at the user's location, providing a first person view (FPV) to the user of what the vehicle "sees" (e.g., what the user would see if he or she were at the vehicle's location). While the first person view video from these vehicles is beneficial, it is not without its problems. One such problem is that playback of the video can cause motion sickness in some users due to the latency of the change in view in response to the user's control of the vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a rendering map of texture frame coordinates to virtual sphere coordinates for a viewing device is obtained, the rendering map having been generated during an initialization process of the viewing device. A first video frame of multiple video frames is received from a camera system of a vehicle and saved into a first texture frame buffer. Texture values for a virtual sphere are determined using the rendering map and the first video frame in the first texture frame buffer, and the virtual sphere is displayed, by the viewing device, using the determined texture values.

In accordance with one or more aspects, a rendering map of texture frame coordinates to virtual sphere coordinates for a viewing device is obtained. A first video frame of multiple video frames is received from a camera system of a vehicle and saved into a first texture frame buffer. Texture values for a virtual hemisphere or sphere are determined using the rendering map and the first video frame in the first texture frame buffer. An indication of pixel values for the viewing device to display the first video frame is provided to the viewing device. Movement of the viewing device to a new position along one or more axes is detected. Without waiting for a camera system of the vehicle to move in response to the movement of the viewing device, the rendering map and a second frame of the multiple video frames are used to determine new texture values for the virtual hemisphere or sphere, the second frame reflects the movement of the viewing device, and an indication of pixel values for the viewing device to display the second video frame is provided to the viewing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
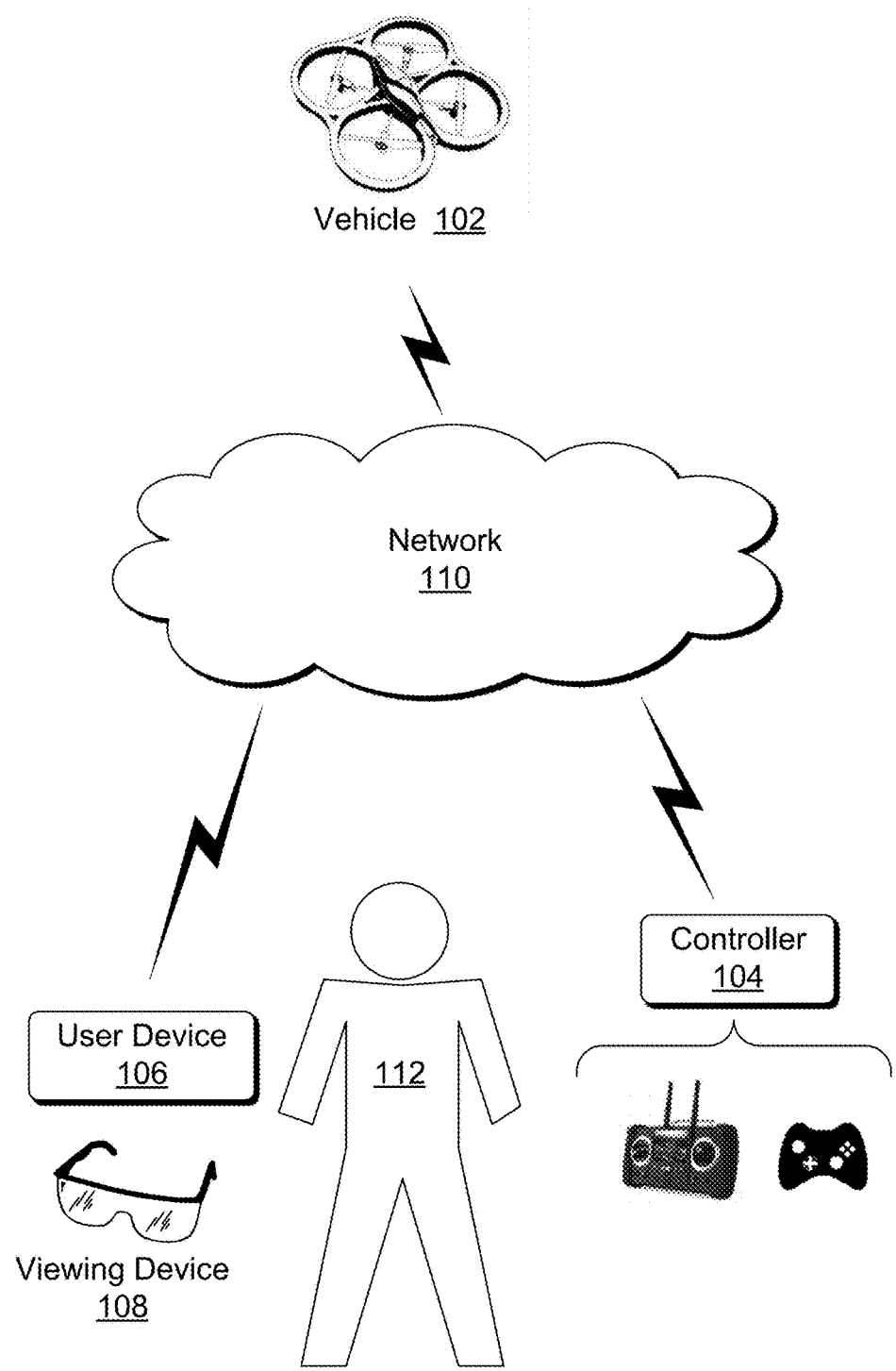
FIG. 1 illustrates an example environment in which the selecting portions of vehicle-captured video to use for display can be implemented.

Selecting portions of vehicle-captured video to use for display is discussed herein. A vehicle includes, or has attached to it, a camera system that captures video and transmits the captured video to a remote user device, and thus the vehicle may also be referred to as a camera carrier. A vehicle, as used herein, refers to a vehicle (e.g., an unmanned vehicle) that is controlled by a remote control. Vehicles can include unmanned aerial vehicles (UAVs) or drones, unmanned ground vehicles (e.g., moving along tracks or wheels), unmanned floating and/or submersible vehicles, and so forth. Vehicles can also include humans used as remotely controlled camera system carriers, for example by translating control commands into sounds or vibrations to tell a human carrier where to go. The camera system wirelessly transmits the captured video to a remote user device. The remote user device communicates with the vehicle via wireless communication, receiving the transmitted video wirelessly and sending commands (e.g., maneuvering commands) to the vehicle wirelessly.

The remote user device includes a viewing device for playback of at least part of the captured video. The viewing device is, for example, virtual reality (VR) glasses or a VR headset, or augmented reality (AR) glasses or an AR headset. As part of an initialization process for the viewing device, a rendering map of video frame (also referred to herein as texture frame) coordinates to virtual sphere coordinates for the viewing device is generated. The rendering map indicates which pixels of the video frame (as identified by particular coordinates of the video frame) correspond to which coordinates of a virtual sphere in which a portion of the video frame is rendered for display. This rendering map allows, for any given video frame and based on a direction the user is looking, the textures (e.g., colors) for the pixels of the virtual sphere to be readily determined and rendered. As video frames are received, the rendering map is used to determine texture values for pixels of the virtual sphere, which in turn is used to generate the display for the user (e.g., in the VR or AR glasses or headset).

The camera system of the vehicle captures video with a wide angle of view, which may be wider than the field of view provided by the viewing device (e.g., the VR or AR glasses or headset). When a user moves his or her head to look in a different direction, the coordinates of the video frames to use for the pixels of the virtual sphere can be readily identified using the rendering map. This can be done relatively quickly (e.g., in less than 10 milliseconds) so as to reduce or eliminate motion sickness and/or VR sickness on the part of the user as a result of latency or lag in changing the camera view. Because the viewing device already has the full video frame captured by the camera system of the vehicle, the updated view as a result of the head movement can be generated by data (the video frame) already at the viewing device. This is in contrast to designs in which a remote control device sends a command to the vehicle to move the camera system in the same direction as the head movement, then waits for the vehicle to send video to the viewing device from that new direction. The time taken to send the command, move the camera system, and receive video in the new (moved to) direction can be 200-500 milliseconds or more. This latency results in a delay of at least 200-500 milliseconds between the user moving his or her head and the video the user views reflecting that movement, which can result in motion sickness and/or VR sickness in some users.

FIG. 1 illustrates an example environment 100 in which the selecting portions of vehicle-captured video to use for display can be implemented. The environment 100 includes a vehicle 102, a controller 104, a user device 106, a viewing device 108, and a network 110. The network 110 can be any of a variety of different networks, including the Internet, a local area network (LAN), a public telephone network, an intranet, other public and/or proprietary networks, combinations thereof, and so forth The vehicle 102, although illustrated as a UAV, can be any vehicle (including a ground vehicle, a floating and/or submersible vehicle, a human camera system carrier, etc.) that is controlled by a remote control as indicated above. The controller 104 is a remote control unit that sends commands wirelessly to the vehicle 102 to control the vehicle 102. In the illustrated example of FIG. 1, a user 112 uses the controller 104 to control the vehicle 102. Different control commands can be provided for different types of vehicles, such as commands indicating which direction to move, commands indicating whether to ascend or descend, commands indicating which speed to move at, and so forth. Additional non-movement based controls can also be provided to the vehicle 102, such as commands indicating to turn on or off a light, commands indicating to begin or stop capturing video, and so forth. In one or more embodiments, the controller 104 sends commands wirelessly to the vehicle 102 via the network 110. Additionally or alternatively, the controller 104 sends commands wirelessly to the vehicle 102 directly rather than via the network 110. Although the controller 104 is illustrated as separate from the user device 106 and the viewing device 108, the controller 104 can alternatively be implemented as part of the user device 106 and/or the viewing device 108.

The vehicle 102 includes a camera system that captures and sends video to the user device 106. The camera system can be incorporated into and thus be part of the vehicle 102, or alternatively can be coupled or attached to the vehicle 102. The video is a set of multiple video frames captured by the camera system at some rate, such as 30 frames per second (fps). The video sent by the camera system to the user device 106 is also referred to as streaming video (or streaming video content, or a video stream), allowing the video content to be received at the user device and displayed on the viewing device 108 as the video content is received rather than waiting for an entire file of video content to be received by the user device 106 prior to playback of the video content.

In one or more embodiments, the camera system of the vehicle 102 sends the video to the user device 106 via the network 110. Additionally or alternatively, the camera system of the vehicle 102 sends the video wirelessly to the vehicle 102 directly rather than via the network 110. The user device 106 is a remote device relative to the vehicle 102, which refers to the user device 106 communicating with the vehicle 102 wirelessly.

The video sent by the camera system of the vehicle 102 is received and processed by the user device 106. This processing includes decoding the video and determining how to display the decoded video to the user 112 via the viewing device 108. This processing of the video includes using a rendering map to determine which pixels of a frame of the video to use to determine the texture (e.g., color) of different coordinates of a virtual sphere to use in rendering the video frame on the viewing device 108.

In one or more embodiments, the viewing device 108 is virtual reality (VR) glasses or headset, or augmented reality (AR) glasses or headset. Such a viewing device provides the user 112 with a first person view of the video that is captured by the camera system of the vehicle 102. Although illustrated as glasses, the viewing device 108 can alternatively be other types of devices on which video can be displayed. For example, the viewing device 108 can be a 3-dimensional (3D) display, a curved or flat display screen (e.g., a computer display screen, a laptop screen, a mobile device screen), and so forth.

In one or more embodiments, the viewing device 108 is a stereo device, displaying two different frames (or two different versions of the same frame) for the video concurrently (e.g., one for the left eye of the VR or AR glasses (or headset), and one for the right eye of the VR or AR glasses (or headset)). The stereo video can be generated in various manners, such as by capturing and streaming two different video streams from the vehicle 102, processing the video to generate an appearance of a stereo view from one or more video capture devices, and so forth. Alternatively, the viewing device 108 can be a single display (e.g., mono), or three or more displays.

In the illustrated example, the user device 106 and the viewing device 108 are two different devices. Alternatively, the user device 106 and the viewing device 108 can be implemented as part of the same device. For example, the user device 106 can be implemented as part of the viewing device 108.

The viewing device 108 and/or user device 106 also send commands wirelessly to the camera system of the vehicle 102 to control the camera system of the vehicle 102. These commands can be sent directly to the camera system, or alternatively can be sent to the camera system via the vehicle 102. These commands sent to the camera system are commands to indicate a direction at which video is to be captured (e.g., as a result of the direction at which the user 112 is looking (e.g., an angle or rotation about one or more axes of the head of the user 112)). For example, the user 112 may turn his or her head 90 degrees to the left, indicating to the camera system of the vehicle 102 to capture video at an angle 90 degrees to the left of where it was previously capturing the video (immediately prior to receipt of the command from the viewing device 108). The manner in which the capture of the video at a different angle is performed can vary based on the manner in which the camera system is implemented, and may include rotation or movement of the vehicle 102, may include rotation or movement of the camera system independent of any rotation or movement of the vehicle 102, may include selection of particular video capture devices, and so forth. It should be noted that the commands sent by the viewing device 108 are different from the commands sent by the controller 104 in that the commands sent by the viewing device 108 control which direction video is captured by the vehicle 102 (which may or may not involve movement of the vehicle) whereas the commands sent by the controller 104 control movement of the vehicle 102 (which may or may not involve a change in which direction video is captured by the vehicle 102).

Although commands to indicate a direction at which video is to be captured can be sent to the vehicle 102, as discussed in more detail below the user device 106 already has sufficient data to allow the display on the viewing device 108 to be changed to reflect the user's movement (e.g., the turning of his or her head) without waiting for the command to be carried out by the vehicle 102.

In one or more embodiments, the viewing device 108 sends commands wirelessly to the camera system of the vehicle 102 via the network 110. Additionally or alternatively, the viewing device 108 sends commands wirelessly to camera system of the vehicle 102 directly rather than via the network 110. Additionally, the viewing device 108 sending commands wirelessly to the camera system can be the viewing device 108 itself sending the commands and/or the user device 106 sending the commands on behalf of the viewing device 108.

The camera system on the vehicle 102 can be implemented in a variety of different manners. In one or more embodiments, the camera system of the vehicle 102 is implemented to have approximately (e.g., within 10% of) a 180 degree field of view. This can be accomplished using a single video capture device or alternatively multiple video capture devices configured in various different arrangements. Each video capture device includes an image sensor capable of sensing an image, and can be implemented using any of a variety of different technologies such as charge-coupled devices (CCDs), complementary metal-oxide-semiconductors (CMOS), N-type metal-oxide-semiconductors (NMOS), and so forth. Alternatively, the camera system of the vehicle 102 is implemented to have a different (e.g., larger) field of view, although the field of view of the camera system is less than the field of view provided by the viewing device 108.

Figure 2:
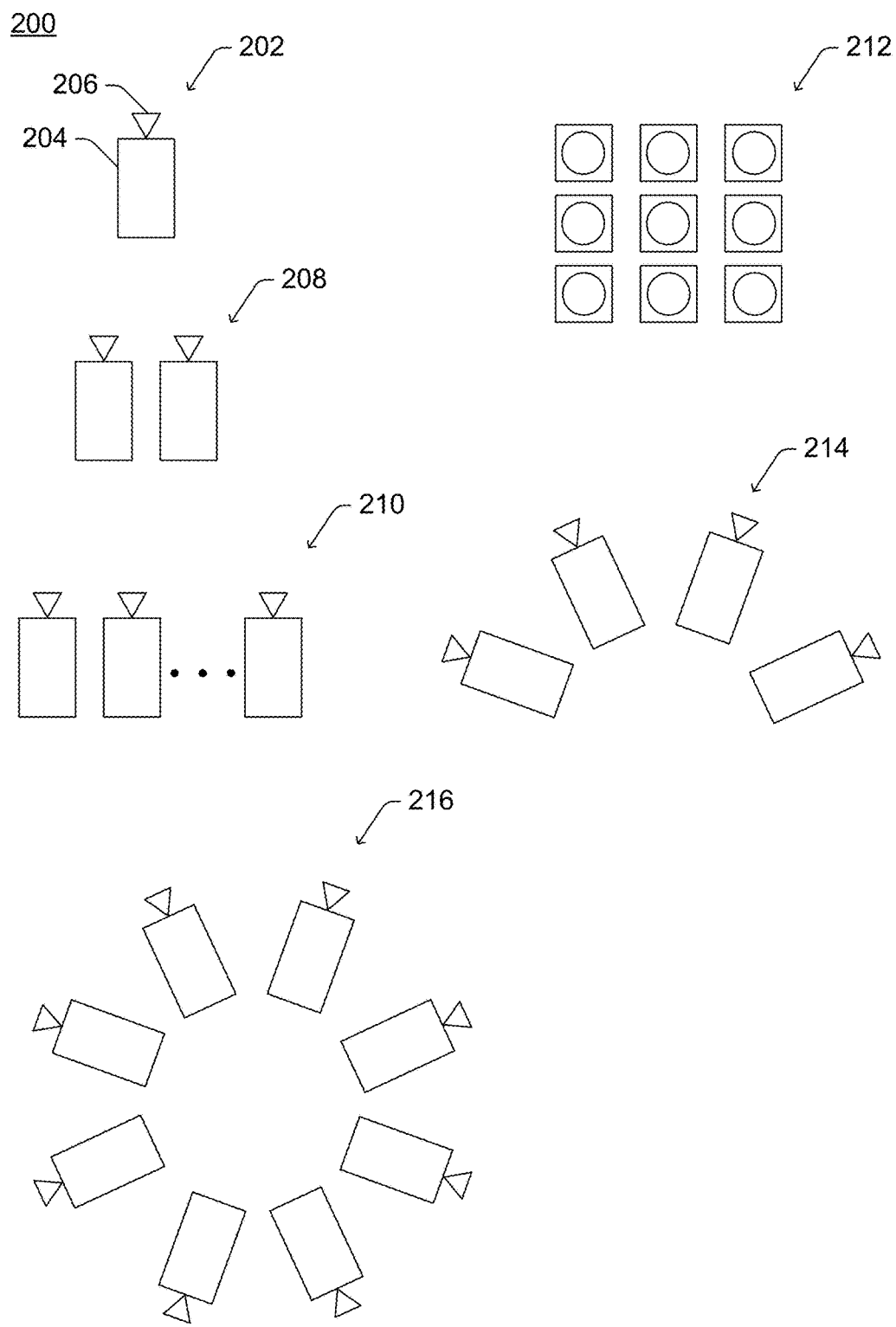
FIG. 2 illustrates several example arrangements of video capture devices for a camera system.

FIG. 2 illustrates several example arrangements of video capture devices for a camera system 200. The camera system 200 can be included as part of, or attached to, the vehicle 102 of FIG. 1. The camera system 200 can be a single video capture device 202 having an image sensor 204 and a lens 206. Alternatively, the camera system 200 can be two video capture devices 202 with approximately parallel (e.g., within 3-5 degrees of being parallel) lines of sight, such as shown in arrangement 208. Alternatively, the camera system 200 can be three or more video capture devices 202 with approximately parallel (e.g., within 3-5 degrees of being parallel) lines of sight, such as shown in arrangement 210.

Alternatively, the camera system 200 can be three or more video capture devices 202 arranged in a grid with approximately parallel (e.g., within 3-5 degrees of being parallel) lines of sight. A front view of such a camera system is shown in arrangement 212. Alternatively, the camera system 200 can be multiple (e.g., four) video capture devices 202 arranged in a semi-circle, such as shown in arrangement 214. Alternatively, the camera system 200 can be multiple (e.g., eight) video capture devices 202 arranged in a circle, such as shown in arrangement 216.

Although example arrangements of video capture devices are illustrated in FIG. 2, it should be noted that any of a variety of different arrangements of video capture devices can be used. For example, video capture devices could be arranged in a hemisphere, a sphere, and so forth.

Figure 3:
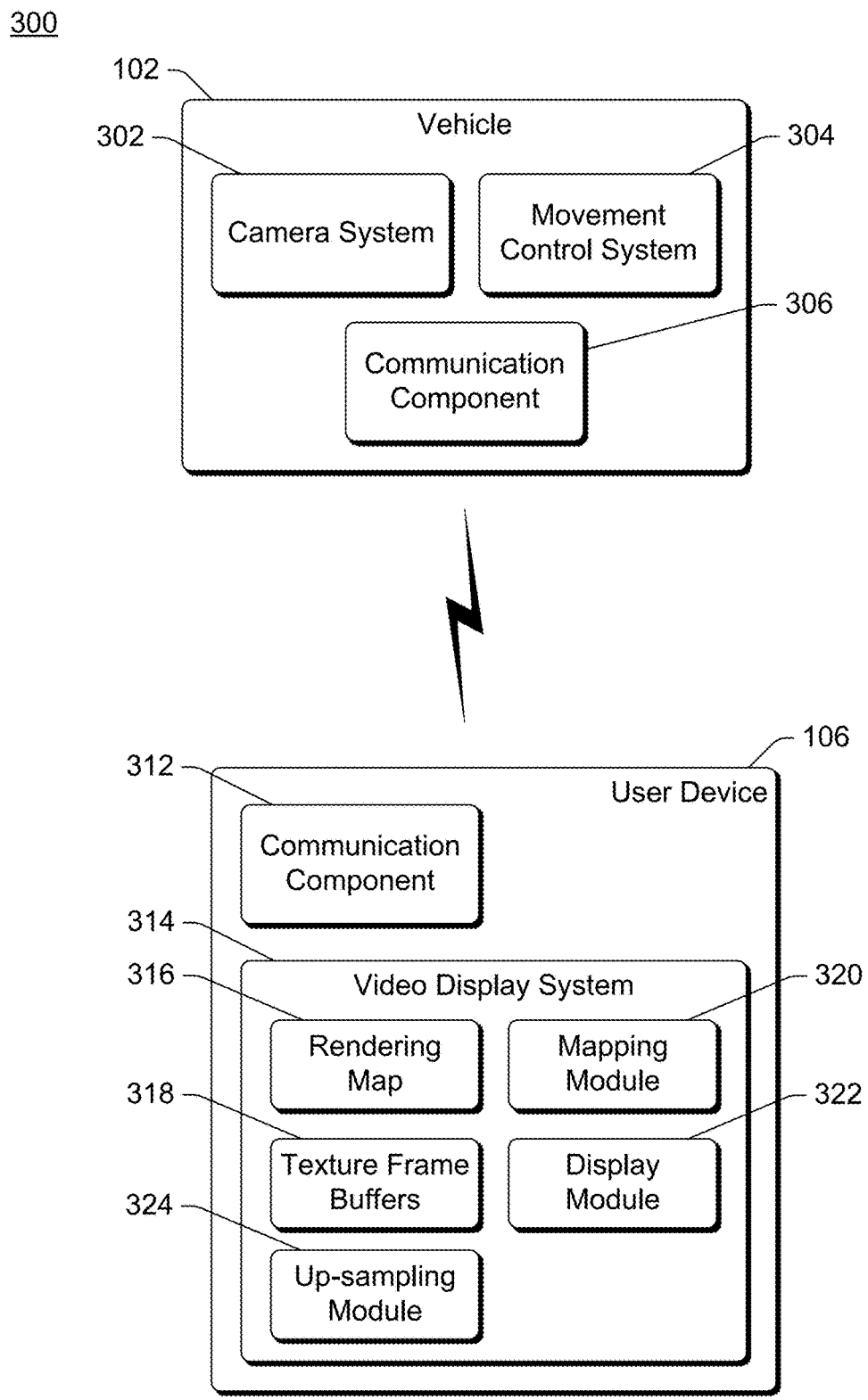
FIG. 3 illustrates an example system implementing the techniques discussed herein in additional detail.

FIG. 3 illustrates an example system 300 implementing the techniques discussed herein in additional detail. The system 300 includes a vehicle 102 and a user device 106. The vehicle 102 includes a camera system 302, a movement control system 304, and a communication component 306. The camera system 302 includes one or more video capture devices, such as one or more video capture devices 202 in any of the arrangements discussed above with respect to FIG. 2. The camera system 302 also includes additional software, firmware, and/or hardware to facilitate capturing frames of video and providing the captured frames to the communication component 306.

The movement control system 304 includes various software, firmware, and/or hardware to manage movement of the vehicle 102, such as various motors, servos, and so forth. Movement commands for the vehicle 102 are received from the user device 106 via the communication component 306, and movement control system 304 carries out those commands. The manner in which the commands are carried out varies based on the particular commands. For example, the commands can be carried out by increasing or decreasing the speed of particular motors (e.g., that turn propellers), activating or deactivating particular servos, and so forth.

The communication component 306 manages communication with the user device 106. The communication component 306 receives movement commands from the controller 104 of FIG. 1 and provides those movement commands to the movement control system 304. The communication component 306 also receives commands directed to the camera system 302 and provides those commands to the camera system 302. The commands directed to the camera system 302 can be received from the user device 106 or the viewing device 108 of FIG. 1 as discussed above.

The communication component 306 also receives frames of video from the camera system 302 and transmits the frames of video to the user device 106. The communication component 306 (and/or camera system 302) can optionally perform various processing on the video prior to transmitting the video to the user device, such as encoding the video using any of a variety of public and/or proprietary protocols (e.g., the H.264 protocol as discussed in the ITU-T H.264 Recommendation (February 2014)), the H.265 protocol as discussed in the ITU-T H.265 Recommendation (April 2015), the VP9 video coding format available from The WebM Project at www.webmproject.org), encrypting the video using any of a variety of public and/or proprietary protocols (e.g., using symmetric key cryptography, using public key cryptography), and so forth.

The user device 106 includes a communication component 312 and a video display system 314. The communication component 312 receives video from the communication component 306 of the vehicle 102. The communication component 312 optionally performs various processing on the video, depending on what processing (if any) was performed prior to the communication component 306 transmitting the video. For example, the communication component 312 can decode the video using any of a variety of public and/or proprietary protocols, decrypt the video using any of a variety of public and/or proprietary protocols, and so forth. The communication component 312 provides the processed (e.g., decoded and/or decrypted) video to the video display system 314.

In situations in which commands are sent to the camera system 302 by the user device, those commands are sent via the communication component 312.

The video display system 314 includes a rendering map 316, texture frame buffers 318, a mapping module 320, and a display module 322. The video display system 314 also optionally includes an up-sampling module 324.

The rendering map 316 maps coordinates of a video frame to coordinates of a virtual sphere. The video frame is a 2-dimensional (2D) coordinate space, whereas the virtual sphere is a 3-dimensional (3D) coordinate space. The rendering map 316 accounts for these different coordinate spaces, and allows, for a given coordinate in the virtual sphere, the texture value of the appropriate pixel (at particular coordinates) in the video frame to be identified and used as the value at that given coordinate in the virtual sphere. The rendering map 316 also accounts for distortions in the frames of video, such as those resulting from the use of fisheye lens in the camera system. The virtual sphere is used by the display module 322 to generate the display on the viewing device, as discussed in more detail below.

Figure 4:
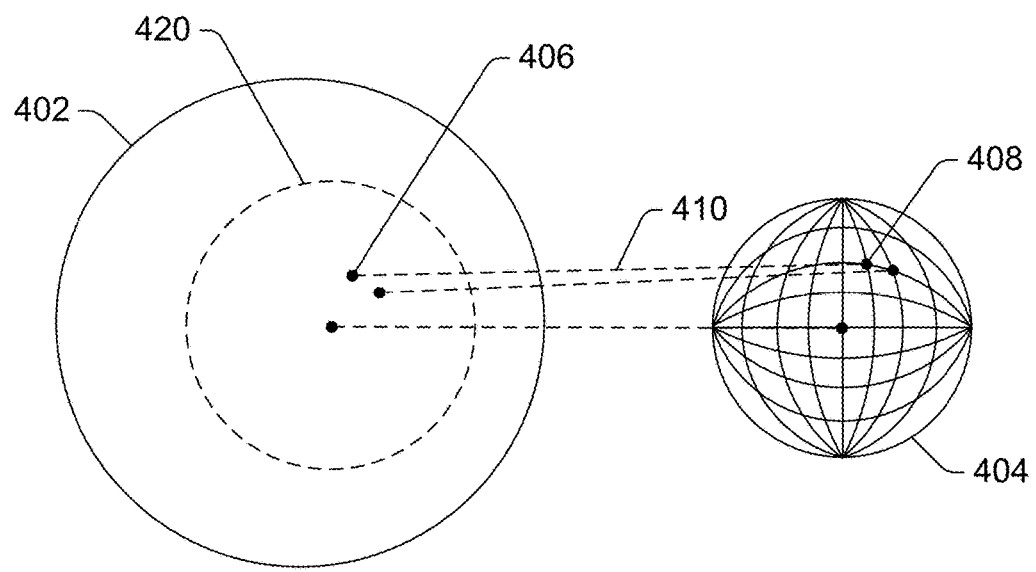
FIGS. 4 and 5 illustrate example mappings of coordinates of a video frame to coordinates of a virtual sphere in accordance with one or more embodiments.
Figure 5:
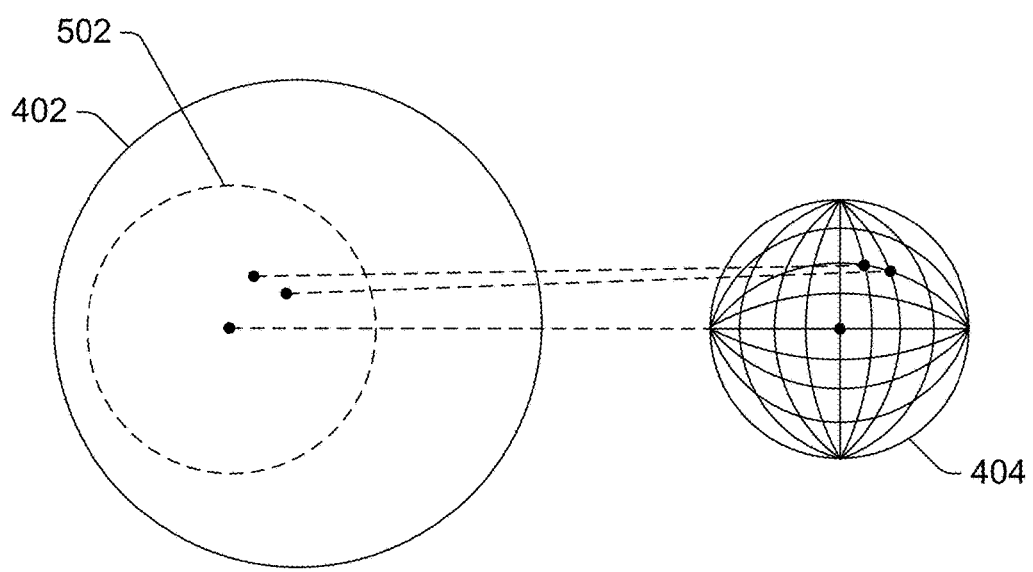

FIGS. 4 and 5 illustrate example mappings of coordinates of a video frame to coordinates of a virtual sphere in accordance with one or more embodiments. In the example of FIG. 4, a video frame 402 and a virtual sphere 404 are illustrated. The mapping from coordinates in the video frame 402 to the virtual sphere 404 are shown with dashed lines. For example, the coordinate 406 of the video frame maps to the coordinate 408 of the virtual sphere 404 as illustrated by the dashed line 410.

It should be noted that, for any given video frame 402, the video frame 402 includes texture values at additional coordinates that are not mapped to any coordinates of the virtual sphere 404. This is a result of the camera system of the vehicle 102 capturing more data (e.g., a wider field of view) than is needed for generating the display at the viewing device 108. For example, the portion 420 of the video frame 402 (the area within the dashed circle) includes the coordinates that are mapped to the virtual sphere 404. Other coordinates of the video frame that are outside of the portion 420 are not mapped to the virtual sphere 404 (for the current video frame 402).

The portion of the video frame 402 that includes coordinates that are mapped to the virtual sphere 404, however, changes as the viewing device 108 (e.g., as the user turns his or her head). For example, in FIG. 4 it is assumed that the user's head is looking or pointed in a particular direction. If the user's head were instead looking or pointed in a different direction (e.g., further to the left), the portion would be shifted to the left as illustrated in FIG. 5. In the example of FIG. 5, the portion 502 of the video frame 402 (the area within the dashed circle) includes the coordinates that are mapped to the virtual sphere 404. Other coordinates of the video frame that are outside of the portion 502 are not mapped to the virtual sphere 404.

Although discussed herein as a virtual sphere, it should be noted that other geometric shapes can alternatively be used based on the field of view of the camera system of the vehicle 102. For example, if the field of view of the camera system of the vehicle 102 is 360 degrees, then a sphere can be used. However, if the field of view of the camera system of the vehicle 102 is only 180 degrees, then a hemisphere can be used. The sphere is also referred to as "virtual" because the sphere is a mathematical or data structure rather than a physical component or device.

Returning to FIG. 3, each frame of video received from the camera system 302 is stored in one of the texture frame buffers 318. At an appropriate time (e.g., at regular intervals, a particular number of milliseconds before a new frame is to be displayed on the viewing device 108, etc.), the mapping module 320 uses the rendering map 316 to assign texture values (e.g., colors) to coordinates in a virtual sphere. This texture mapping or assigning is a mapping between 3D virtual sphere coordinates and 2D UV coordinates on the texture (on the display device or screen). For each coordinate in the virtual sphere, the mapping module 320 determines the mapped-to coordinate of the video frame in the texture frame buffers 318, obtains the texture value of the pixel at that mapped-to coordinate of the video frame, and sets or otherwise assigns the coordinate in the virtual sphere to the texture value of the pixel at that mapped-to coordinate.

Figure 6:
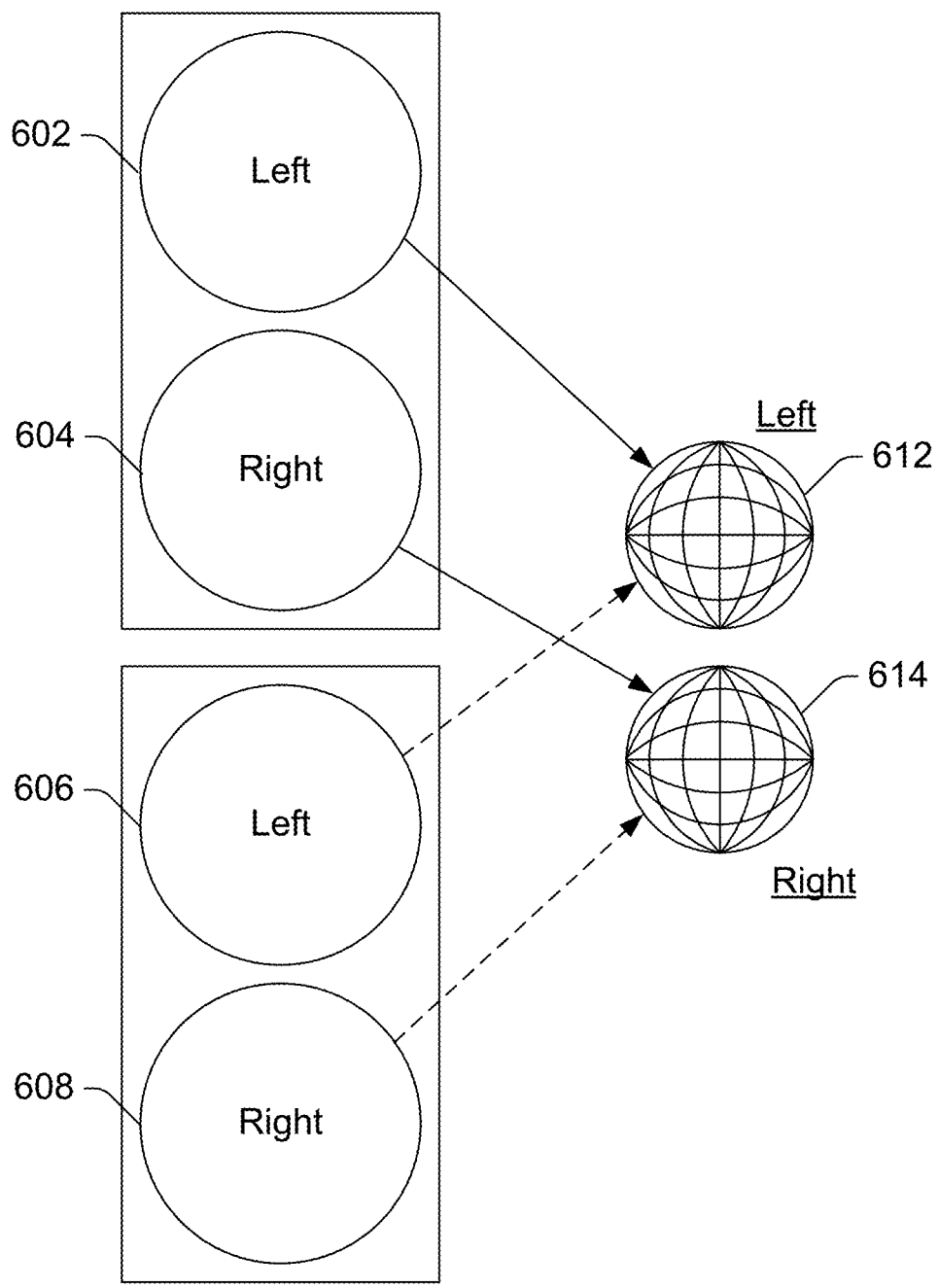
FIG. 6 illustrates an example of the mapping of video frames in texture frame buffers to virtual spheres in accordance with one or more embodiments.

FIG. 6 illustrates an example of the mapping of video frames in the texture frame buffers to virtual spheres in accordance with one or more embodiments. In the example of FIG. 6, four texture frame buffers 602, 604, 606, and 608 are illustrated. Two virtual spheres 612 and 614 are also illustrated. Each virtual sphere 612, 614 is associated with a particular part of the viewing device 108, illustrated as the left part 612 (e.g., the left display screen or lens of VR or AR glasses (or headset)) and the right part 614 (e.g., the right display screen or lens of VR or AR glasses (or headset)). For a first video frame to be displayed, a pair of video frames is received and/or generated that correspond to that first video frame and provide a stereo effect when displayed in the VR or AR glasses (or headset). The pair of video frames for the first video frame are stored in the texture frame buffers 602 and 604. Those video frames in the texture frame buffers 602 and 604 are used to assign values to the coordinates of the virtual spheres 612 and 614 for the first video frame. The virtual spheres 612 and 614 are then displayed concurrently by the viewing device 108.

For a next video frame to be displayed (referred to in this example as a second video frame to be displayed), a pair of video frames is received and/or generated that correspond to that second video frame and provide a stereo effect when displayed in the VR or AR glasses (or headset). The pair of video frames for the second video frame are stored in the texture frame buffers 606 and 608. Those video frames in the texture frame buffers 606 and 608 are used to assign values to the coordinates of the virtual spheres 612 and 614 for the second video frame. The virtual spheres 612 and 614 are then displayed concurrently by the viewing device 108.

For a next video frame to be displayed (referred to in this example as a third video frame to be displayed), a pair of video frames is received and/or generated that correspond to that second video frame and provide a stereo effect when displayed in the VR or AR glasses (or headset). The pair of video frames for the third video frame are stored in the texture frame buffers 602 and 604, replacing the pair of video frames for the first video frame previously stored in the texture frame buffers 602 and 604. For a next video frame to be displayed, a pair of video frames is received and/or generated that correspond to that next video frame are stored in the texture frame buffers 606 and 608, replacing the pair of video frames for the second video frame previously stored in the texture frame buffers 606 and 608. This process then repeats, with alternating pairs of video frames being stored in the buffers 602, 604, and then the buffers 606, 608.

When the direction of the viewing device changes (e.g., a user turns his or her head), the movement can be readily reflected in the data generated for the virtual sphere and thus reflected in the display to the user by changing the portion of the video frame in the current pair of texture frame buffers that is used based on the movement. For example, referring again to FIGS. 4 and 5, assume that for a first pair of video frames the user's head is looking or pointing in a particular direction that corresponds to the portion 420 of FIG. 4 being mapped to the virtual spheres. For the first pair of video frames in the texture frame buffers, the texture values for the coordinates in the portion 420 are used to determine the values at the mapped-to coordinates of the virtual spheres 612 and 614. Further assume that the user turns his or her head to the left and for the second pair of video frames the user's head is looking or pointing in a particular direction that corresponds to the portion 502 of FIG. 5 being mapped to the virtual spheres. For the second pair of video frames in the texture frame buffers, the texture values for the coordinates in the portion 502 are used to determine the values at the mapped-to coordinates of the virtual spheres 612 and 614.

Thus, the data used (the texture values of pixels of the video frames in the texture frame buffers) to determine the texture values when the user moves his or her head is already available at the user device 106. This data can be immediately used, and the next frame displayed to the user can reflect the movement. The video display system 314 need not wait for a command to be sent to the camera system 302, wait for the camera system 302 to be moved or otherwise changed to capture video in a different direction as a result of the movement of the user's head, and wait for the newly captured video to be sent to the user device 106. Such a delay could be at least 200-500 milliseconds, and would result in motion sickness and/or VR sickness for some users. However, because the data to determine the texture values when the user moves his or her head is already available at the user device 106, no such delay is incurred.

It should be noted that the data in the texture frame buffers 602, 604, 606, and 608 is the data for the full video frames. In other words, the data in the texture frame buffers 602, 604, 606, and 608 refer to a full video frame 402 of FIG. 4. or FIG. 5, not just a portion 420 or 502 of the video frame 402. No cropping or cutting of the video frame need be performed—the portion of the video frame to use is determined using the rendering map as discussed above.

Returning to FIG. 3, the rendering map 316 can be generated using any of a variety of different public and/or proprietary techniques. In one or more embodiments, the rendering map 316 is generated based on intrinsic parameters of the camera system 302 and extrinsic parameters of the camera system 302 (in situations in which the camera system 302 includes multiple video capture devices). Intrinsic parameters of the camera system 302 refer to parameters describing, for each video capture device, how images (each video frame) is formed on the sensor of the camera. The video capture devices can use lenses with various different distortions, particularly along the edges of the lens, either intentionally or unintentionally. For example, the lenses can be fisheye lenses so that captured looks more like a circle along the edges. The intrinsic parameters describe this distortion, and allow the captured video frames to be undistorted and made rectilinear so that straight lines look straight rather than curved.

Extrinsic parameters of the camera system 302 refer to parameters describing how the different video capture devices relate to one another geometrically in 3D. In situations in which the camera system 302 includes multiple video capture devices, the optical axis of those video capture devices may be approximately parallel (e.g., with in a threshold number of degrees of being parallel) but may be off from parallel slightly (e.g., by 2 to 3 degrees). The extrinsic parameters identify the distances between the optical axes of the video capture devices, and the differences between their optical axes. The extrinsic parameters allow the video frames captured by the multiple video capture devices to be aligned and combined so that they appear to have been captured by a single video capture device.

These intrinsic and extrinsic parameters can be used by the video display system 314, or alternatively another device separate from the user device 106, to generate the rendering map 316. The intrinsic and extrinsic parameters can be stored in various locations, such as at the camera system 302, at the user device 106, at some other location (e.g., accessed via the network 110 of FIG. 1), and so forth. Given the intrinsic and extrinsic parameters, the rendering map 316 can be readily generated by projecting the coordinates from the virtual sphere onto a video frame and recording in the rendering map 316 the association of each coordinate in the virtual sphere with each mapped-to coordinate of the video frame.

As discussed above, at any given time not all of the coordinates of a video frame map to the virtual sphere. Which coordinates of the video frame map to the virtual sphere at any given time is dependent on the direction that the viewing device is pointed (e.g., the direction that the user turns his or her head along one or more axes, such as horizontally and/or vertically) at that time, and can be generated in any of a variety of different manners. In one or more embodiments, for each increment of movement along an axis (e.g., each degree) from some direction defined as an origin (e.g., the viewing device directed North and parallel to the ground), a different rendering map 316 can be created or a particular portion of the rendering map 316 to use can be specified (e.g., and included as part of the rendering map 316). Additionally or alternatively, the rendering map 316 can be generated assuming the direction is the origin and an offset value or algorithm can be calculated to determine, given an increment of movement from the origin, how to convert each video frame coordinate in the rendering map 316 to a new coordinate for the current direction.

The display module 322 can use the virtual spheres (and the texture values mapped to the virtual spheres) to generate the display for viewing device 108 using any of a variety of different public and/or proprietary techniques. In one or more embodiments, the display module 322 uses the texture values for the coordinates of the virtual sphere to provide, to the viewing device, an indication of the pixel values to be displayed by the viewing device to display the video frame.

Situations can arise in which the resolution of the display of the viewing device is greater than that of the virtual sphere, in which case the display module 322 uses any of a variety of different public and/or proprietary techniques to fill in the pixel values given the known pixel values from the virtual sphere. By way of example, any of a variety of different interpolation techniques can be used to generate the fill-in pixel values given the known pixel values from the virtual sphere.

In one or more embodiments, the video display system 314 also includes an up-sampling module 324. The up-sampling module 324 up-samples the video frames to a higher framerate. This can be done in various manners, such as by using two consecutive frames in the video to create a new artificial frame in between them, by using current and previous frames to predict the next frame, and so forth. This up-sampling creates an illusion of smoother video when a vehicle flies fast and therefore reduces motion sickness and/or VR sickness caused by a low frame rate and/or lagging video.

Figure 7:
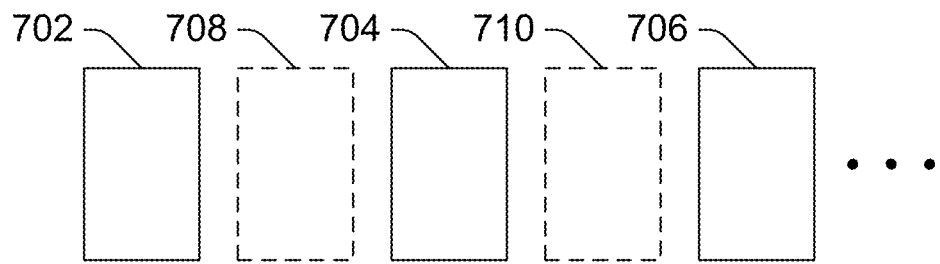
FIG. 7 illustrates an example of the up-sampling in accordance with one or more embodiments.

FIG. 7 illustrates an example of the up-sampling in accordance with one or more embodiments. A series of video frames 700 is illustrated. The series of video frames includes both received video frames 702, 704, and 706, illustrated with solid lines. The series of video frames also includes artificial frames 708 and 710, illustrated with dashed lines. Any of a variety of different public and/or proprietary techniques can be used to generate the artificial frames 708 and 710. For example, the texture values for pixels in the artificial frame 708 can be generated by interpolating between the texture values for pixels in video frames 702 and 704. By way of another example, the texture values for pixels in the artificial frame 710 can be generated by using the texture values for pixels in video frames 702 and 704 to predict the texture values for pixels in artificial frame 710.

In or more embodiments, the video received from the vehicle 102 is a series of sequential frames captured at some rate, such as thirty frames per second. When the user moves his or her head, the display is generated using the immediately next video frame sequentially to the video frame used to generate the previous display. For example, if video frame 704 is used to generate the frame displayed before the user moves his or her head, after the user moves his or her head the video frame 706 (or alternatively the artificial frame 710) is used to generate the frame displayed. The display of video frames (whether received from the vehicle 102 or artificial) is maintained at an approximately (e.g., within a threshold amount) constant rate, such as 60 frames per second. As the user moves his or her head, the appropriate portions of the appropriate video frames are used to generate the display as discussed above.

A single series of video frames 700 is illustrated in FIG. 7. Each of the video frames 702, 704, 706, 708, etc. can be used to generate a pair of video frames to create a stereo effect as discussed above. Alternatively, a second series of video frames analogous to the series of video frames 700 can be received (and artificial frames similarly generated), in which case the series of video frames 700 can be used as one half of the pair of video frames (e.g., for the left display screen of VR or AR glasses or headset), and the second series of video frames can be used as the other half of the pair of video frames (e.g., for the right display screen of VR or AR glasses or headset).

Thus, due to the delay in transmitting the video from the vehicle 102 to the user device 106 (whether via the network 110 or directly), the user 112 effectively has a delayed view of the world (from the point of view of the vehicle). For example, if the delay in transmitting the video from the vehicle 102 to the user device 106 is 200 milliseconds, then the video that is displayed to the user is actually 200 milliseconds old (200 milliseconds in the past). However, because the user device 106 does not need to wait for movement of the camera system at the vehicle 102 to reflect movement of the viewing device (e.g., turning the user's head), the movement happens quickly (e.g., in less than 10 milliseconds), although using the video that is 200 milliseconds old.

Figure 8:
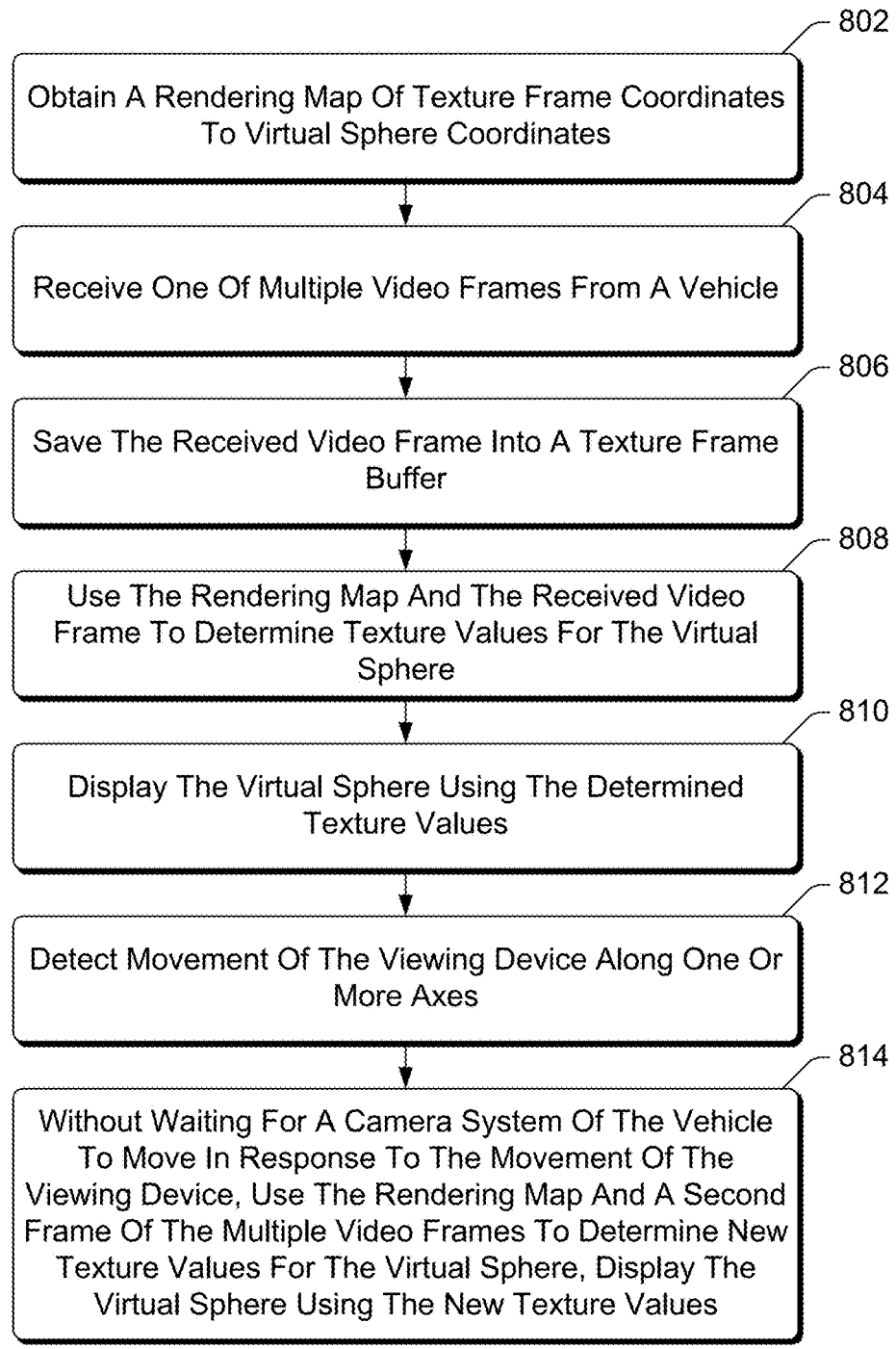
FIG. 8 is a flowchart illustrating an example process for selecting portions of vehicle-captured video to use for display in accordance with one or more embodiments.

FIG. 8 is a flowchart illustrating an example process 800 for selecting portions of vehicle-captured video to use for display in accordance with one or more embodiments. Process 800 is carried out by a user device and/or viewing device, such as user device 106 and/or viewing device 108 of FIG. 1, and can be implemented in software, firmware, hardware, or combinations thereof. Process 800 is shown as a set of acts and is not limited to the order shown for performing the operations of the various acts. Process 800 is an example process for selecting portions of vehicle-captured video to use for display; additional discussions of selecting portions of vehicle-captured video to use for display are included herein with reference to different figures.

In process 800, a rendering map of texture frame coordinates to virtual sphere coordinates is obtained (act 802). The rendering map is obtained at a time of initialization of the user device and/or viewing device, and in one or more embodiments is generated by the user device and/or viewing device. The initialization of the user device and/or viewing device refers to a startup or configuration of the user device and/or viewing device, and can occur when the user device and/or viewing device is powered on, when the user device and/or viewing device connects to or is set up to communicate with the vehicle 102, and so forth. Alternatively, the rendering map can have been previously generated (e.g., during a previous use of the vehicle, user device, and viewing device) and stored, and can be obtained in act 802 by being retrieved from storage.

One of multiple frames of video is received from a vehicle (act 804). The video can be captured by the vehicle using any of a variety of different camera systems as discussed above. Frames of the video are received from the vehicle sequentially, typically one frame at a time.

The received video frame is saved in a texture frame buffers (act 806). The received video frame is optionally processed to generate a pair of video frames corresponding to the received video frame, the pair of video frames providing a stereo effect when displayed by the viewing device (e.g., VR or AR glasses or headset).

The rendering map and the received video frame are used to determine texture values for the virtual sphere (act 808). This can be performed for the pair of video frames, so texture values for two virtual spheres are determined.

The virtual sphere is displayed using the determined texture values (act 810). The virtual sphere can be displayed using any of a variety of different public and/or proprietary techniques as discussed above.

Movement of the viewing device along one or more axes is detected (act 812). These one or more axes refer to, for example, the user rotating his or her head, the user moving his or head up or down, and so forth. This movement can be detected in various manners, such as using sensors in the viewing device.

In response to the detected movement, without waiting for a camera system of the vehicle to move in response to the movement of the viewing device, the rendering map and a second frame of the multiple video frames are used to determine new texture values for the virtual sphere, and the virtual sphere is displayed using the new texture values (act 814). The second frame reflects the movement of the viewing device, so the video shown to the user in the viewing device is changed in response to the movement of the viewing device without waiting for a camera system of the vehicle to move in response to the movement of the viewing device.

It should be noted that, as discussed above, the rendering map is generated during an initialization process of the viewing device. The generated rendering map is used for each of the multiple video frames that is received from the vehicle. A rendering map need not be re-generated for each video frame received from the vehicle.

Although particular functionality is discussed herein with reference to particular modules, components, or systems, it should be noted that the functionality of individual modules, components, or systems discussed herein can be separated into multiple modules, components, or systems, and/or at least some functionality of multiple modules, components, or systems can be combined into a single module, component, or system.

Figure 9:
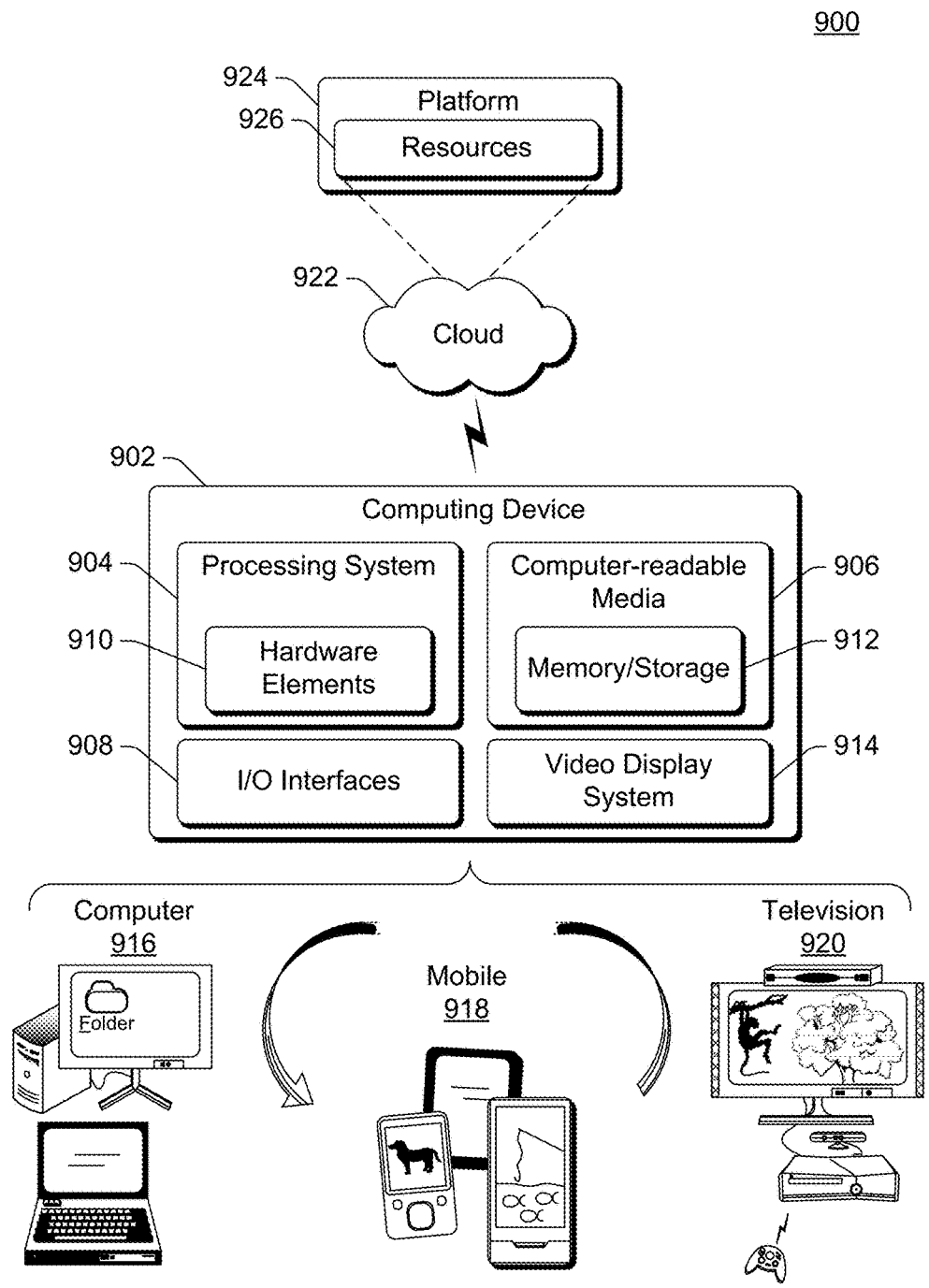
FIG. 9 illustrates an example system that includes an example computing device that is representative of one or more systems and/or devices that may implement the various techniques described herein.

FIG. 9 illustrates an example system generally at 900 that includes an example computing device 902 that is representative of one or more systems and/or devices that may implement the various techniques described herein. The computing device 902 may be, for example, a server of a service provider, a device associated with a client (e.g., a client device), an on-chip system, and/or any other suitable computing device or computing system. The computing device 902 can implement, for example, the user device 106 of FIG. 1

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

The one or more input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

The computing device 902 also includes video display system 914. The video display system 914 provides various video display functionality as discussed above. The video display system 914 can implement, for example, the video display system 314 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 902 may assume a variety of different configurations, such as for computer 916, mobile 918, and television 920 uses. Each of these configurations includes devices that may have generally different constructs and capabilities, and thus the computing device 902 may be configured according to one or more of the different device classes. For instance, the computing device 902 may be implemented as the computer 916 class of a device that includes a personal computer, desktop computer, a multi-screen computer, laptop computer, netbook, and so on.

The computing device 902 may also be implemented as the mobile 918 class of device that includes mobile devices, such as a mobile phone, portable music player, portable gaming device, a tablet computer, a multi-screen computer, and so on. The computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 922 via a platform 924 as described below.

The cloud 922 includes and/or is representative of a platform 924 for resources 926. The platform 924 abstracts underlying functionality of hardware (e.g., servers) and software resources of the cloud 922. The resources 926 may include applications and/or data that can be utilized while computer processing is executed on servers that are remote from the computing device 902. Resources 926 can also include services provided over the Internet and/or through a subscriber network, such as a cellular or Wi-Fi network.

The platform 924 may abstract resources and functions to connect the computing device 902 with other computing devices. The platform 924 may also serve to abstract scaling of resources to provide a corresponding level of scale to encountered demand for the resources 926 that are implemented via the platform 924. Accordingly, in an interconnected device embodiment, implementation of functionality described herein may be distributed throughout the system 900. For example, the functionality may be implemented in part on the computing device 902 as well as via the platform 924 that abstracts the functionality of the cloud 922.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining a rendering map of texture frame coordinates to virtual sphere coordinates for a viewing device, the rendering map having been generated during an initialization process of the viewing device; receiving a first video frame of multiple video frames from a camera system of the vehicle; saving the first video frame of the multiple frames into a first texture frame buffer; using the rendering map and the first video frame in the first texture frame buffer to determine texture values for a virtual sphere; and displaying, by the viewing device, the virtual sphere using the determined texture values.

Alternatively or in addition to any of the above described methods, any one or combination of: the viewing device comprising a virtual reality headset or glasses; the viewing device comprising an augmented reality headset or glasses; the displaying including providing a first person view of the vehicle; the method further comprising repeating the saving, using, and displaying for a pair of frames for the first video frame and a pair of virtual spheres, and displaying the pair of virtual spheres concurrently; the method further comprising receiving a second video frame of the multiple video frames from the vehicle, saving the second video frame of the multiple frames into a second texture frame buffer, generating a third video frame by using the first video frame and the second video frame to up-sample the multiple video frames, using the rendering map and the third video frame to determine additional texture values for the virtual sphere, and displaying, by the viewing device, the virtual sphere using the determined texture values; the method further comprising detecting a movement of the viewing device to a new position along one or more axes, receiving a second video frame of the multiple video frames from the vehicle, the second video frame being an immediately next video frame sequentially to the first video frame, saving the second video frame of the multiple frames into a second texture frame buffer, using the rendering map and the second video frame in the texture buffer to determine new texture values for the virtual sphere, and displaying, by the viewing device, the virtual sphere using the new texture values; the method further comprising detecting a movement of the viewing device to a new position along one or more axes, and without waiting for a camera system of the vehicle to move in response to the movement of the viewing device using the rendering map and a second frame of the multiple video frames to determine new texture values for the virtual sphere, and displaying, by the viewing device, the second frame reflecting the movement of the viewing device; the method reducing motion sickness and/or virtual reality sickness induced by a lag in receiving the multiple video frames form the camera system.

A video display system comprising: a rendering map including a mapping of texture frame coordinates to virtual hemisphere or sphere coordinates for a viewing device, the rendering map having been generated during an initialization process of the viewing device; a communication component configured to receive, from a camera system of a vehicle, multiple video frames including a first video frame; a first texture frame buffer storing the first video frame after receipt of the video frame from the vehicle; a mapping module configured to determine texture values for a virtual hemisphere or sphere based on the rendering map and the first video frame in the first texture frame buffer; and a display module configured to provide, to the viewing device, pixel values for the viewing device to display the video frame.

Alternatively or in addition to any of the above described video display systems, any one or combination of: the video display system being implemented in the viewing device; the video display system being implemented in a user device coupled to the viewing device; the multiple video frames including a second video frame, the video display system further comprising an up-sampling module configured to generate a third frame by using the first video frame and the second video frame to up-sample the multiple video frames; the mapping module being further configured to, using the rendering map and responsive to a movement of the viewing device to a new position along one or more axes, determine texture values for the virtual hemisphere or sphere for a second video frame of the multiple video frames stored in a second texture frame buffer; the second video frame being an immediately next video frame sequentially to the first video frame; the mapping module being further configured to determine texture values for the virtual hemisphere or sphere for the second video frame without waiting for a camera system of the vehicle to move in response to the movement of the viewing device.

A computing device comprising: one or more processors; a computer-readable storage medium having stored thereon multiple instructions that, responsive to execution by the one or more processors, cause the one or more processors to perform acts comprising: obtaining a rendering map of texture frame coordinates to virtual sphere coordinates for a viewing device; receiving a first video frame of multiple video frames from a vehicle; saving the first video frame of the multiple frames into a first texture frame buffer; using the rendering map and the first video frame in the first texture frame buffer to determine texture values for a virtual sphere; providing, to the viewing device, an indication of pixel values for the viewing device to display the first video frame; detecting a movement of the viewing device to a new position along one or more axes; and without waiting for a camera system of the vehicle to move in response to the movement of the viewing device: using the rendering map and a second frame of the multiple video frames to determine new texture values for the virtual sphere, the second frame reflecting the movement of the viewing device, and providing, to the viewing device, an indication of pixel values for the viewing device to display the second video frame.

Alternatively or in addition to any of the above described computing devices, any one or combination of: the viewing device comprising a virtual reality headset, virtual reality glasses, an augmented reality headset, or augmented reality glasses; the acts further comprising generating a third video frame by using the first video frame and the second video frame to up-sample the multiple video frames, using the rendering map and the third video frame to determine additional texture values for the virtual sphere, and providing, to the viewing device, an indication of pixel values for the viewing device to display the third video frame; the rendering map having been generated during an initialization process of the viewing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining a rendering map, the rendering map defining a mapping of texture frame coordinates to virtual sphere coordinates for a viewing device, the rendering map generated during an initialization process of the viewing device, the texture frame coordinates corresponding to coordinates of a field of view of a camera system, the virtual sphere coordinates corresponding to coordinates of a field of view of a viewing device, the field of view of the camera system greater than the field of view of the viewing device;
   receiving multiple video frames from the camera system, the multiple video frames captured with the camera system pointed in a first direction;
   storing the multiple video frames in at least one texture frame buffer;
   using the rendering map and a first video frame of the multiple video frames in the first texture frame buffer to determine texture values for a virtual sphere, the texture values corresponding to a first grid of pixels of the first video frame that comprise a proper subset of the first video frame;

displaying, by the viewing device, the virtual sphere using the determined texture values;

detecting a movement of the viewing device to a new position;

in response to detecting the movement of the viewing device, wirelessly communicating a command to the camera system to indicate a second direction in which to point the camera system to capture subsequent video frames, the second direction based on the detected movement of the viewing device and different than the first direction; and without waiting for the camera system to move to capture the subsequent video frames in the second direction:

using the rendering map and a second video frame of the multiple video frames to determine new texture values for the virtual sphere, the new texture values corresponding to a second grid of pixels, the second grid of pixels different from the first grid of pixels, comprising a proper subset of the second video frame, and corresponding to a view of the viewing device after the movement, and displaying, by the viewing device, the virtual sphere updated with the new texture values reflecting the movement of the viewing device.

2. The method of claim 1, the viewing device comprising a virtual reality headset or glasses.

3. The method of claim 1, the viewing device comprising an augmented reality headset or glasses.

4. The method of claim 1, the displaying including providing a first person view of the vehicle.

5. The method of claim 1, further comprising repeating the saving, using, and displaying for a pair of frames for the first video frame and a pair of virtual spheres, and displaying the pair of virtual spheres concurrently.

6. The method of claim 1, further comprising:

generating a third video frame by using the first video frame and the second video frame to up-sample the multiple video frames;

using the rendering map and the third video frame to determine additional texture values for the virtual sphere; and displaying, by the viewing device, the virtual sphere using the determined texture values.

7. The method of claim 1, the second video frame being an immediately next video frame sequentially to the first video frame and stored in a different texture buffer of the at least one texture buffer than the first video frame.

8. The method of claim 1, the method reducing motion sickness and/or virtual reality sickness induced by a lag in receiving the multiple video frames from the camera system.

9. The method of claim 1, the using the rendering map and the first video frame in the first texture frame buffer to determine texture values for the virtual sphere comprising using a portion of the first video frame having first frame coordinates mapped to the virtual sphere, and the using the rendering map and the second frame of the multiple video frames to determine new texture values for the virtual sphere comprising using a portion of the second video frame having second frame coordinates mapped to the virtual sphere, the second frame coordinates being different than the first frame coordinates.

10. The method of claim 1, wherein wirelessly communicating the command controls the camera system to capture video frames in the second direction.

11. The method of claim 1, wherein the second frame of the multiple video frames is received at the viewing device prior to detecting movement of the viewing device to the new position.

12. A video display system comprising:

a rendering map including a mapping of texture frame coordinates to virtual hemisphere or sphere coordinates for a viewing device, the rendering map having been generated during an initialization process of the viewing device, the texture frame coordinates corresponding to coordinates of a field of view of a camera system of a vehicle, the virtual hemisphere or sphere coordinates corresponding to coordinates of a field of view of a viewing device, the field of view of the camera system greater than the field of view of the viewing device;

at least a memory and a processor to perform operations comprising:

receiving, from a camera system of a vehicle, multiple video frames including a first video frame captured with the camera system pointed in a first direction;

storing, in a first texture frame buffer, the first video frame after receipt of the first video frame from the vehicle;

using the rendering map and the first video frame, determining texture values for a virtual hemisphere or sphere based on the rendering map and the first video frame in the first texture frame buffer, the texture values corresponding to a first grid of pixels of the first video frame that comprise a proper subset of the first video frame;

providing, to the viewing device, pixel values for the viewing device to display the first video frame;

wirelessly communicating a command to the camera system to indicate a second direction in which subsequent video frames are to be captured by the camera system in response to a movement of the viewing device;

without waiting for the camera system to move to capture the subsequent video frames in the second direction, determining new texture values for the virtual hemisphere or sphere for a second video frame of the multiple video frames stored in a second texture frame buffer, the new texture values corresponding to a second grid of pixels, the second grid of pixels different from the first grid of pixels, comprising a proper subset of the second video frame, and corresponding to a view of the viewing device after the movement; and without waiting for the camera system to move to capture video frames in the second direction, providing to the viewing device pixel values based on the new texture values for the viewing device to display the second video frame.

13. The video display system of claim 12, the video display system being implemented in the viewing device.

14. The video display system of claim 12, the video display system being implemented in a user device coupled to the viewing device.

15. The video display system of claim 12, the video display system further comprising an up-sampling module generating a third frame by using the first video frame and the second video frame to up-sample the multiple video frames.

16. The video display system of claim 12, the second video frame being an immediately next video frame sequentially to the first video frame.

17. A computing device comprising:
one or more processors;
a computer-readable storage medium having stored thereon multiple instructions that, responsive to execution by the one or more processors, cause the one or more processors to perform acts comprising:
obtaining a rendering map, the rendering map defining a mapping of texture frame coordinates to virtual sphere coordinates for a viewing device, the texture frame coordinates corresponding to coordinates of a field of view of a camera system, the virtual sphere coordinates corresponding to coordinates of a field of view of a viewing device, the field of view of the camera system greater than the field of view of the viewing device;
receiving multiple video frames from the camera system, the multiple video frames captured with the camera system pointed in a first direction;
storing the the multiple video frames in at least one texture frame buffer;
using the rendering map and a first video frame of the multiple video frames in the first texture frame buffer to determine texture values for a virtual sphere, the texture values corresponding to a first grid of pixels of the first video frame that comprise a proper subset of the first video frame;
providing, to the viewing device, an indication of pixel values for the viewing device to display the first video frame;
detecting a movement of the viewing device to a new position;
in response to detecting the movement of the viewing device, wirelessly communicating a command to the camera system to indicate a second direction in which to point the camera system to capture subsequent video frames, the second direction based on the detected movement of the viewing device and different than the first direction; and
without waiting for the camera system to move to capture the subsequent video frames in the second direction:
using the rendering map and a second frame of the multiple video frames to determine new texture values for the virtual sphere, the second video frame reflecting the movement of the viewing device, the new texture values corresponding to a second grid of pixels, the second grid of pixels different from the first grid of pixels, comprising a proper subset of the second video frame, and corresponding to a view of the viewing device after the movement, and
providing, to the viewing device, an indication of pixel values for the viewing device to display the virtual sphere updated with the new texture values.

18. The computing device of claim 17, the acts further comprising:
generating a third video frame by using the first video frame and the second video frame to up-sample the multiple video frames;
using the rendering map and the third video frame to determine additional texture values for the virtual sphere; and
providing, to the viewing device, an indication of pixel values for the viewing device to display the third video frame.

19. The computing device of claim 17, the rendering map having been generated during an initialization process of the viewing device.

20. The computing device of claim 17, the second video frame being an immediately next video frame sequentially to the first video frame.

* * * * *